United States Patent [19]

Kazaoka et al.

[11] Patent Number: 4,460,144
[45] Date of Patent: Jul. 17, 1984

[54] VERTICALLY ADJUSTABLE SEAT FOR VEHICLES

[75] Inventors: Kenichi Kazaoka, Nagoya; Yukifumi Yamada, Toyota, both of Japan

[73] Assignee: Aisin Seiki Kabushiki Kaisha, Kariya, Japan

[21] Appl. No.: 304,911

[22] Filed: Sep. 23, 1981

[30] Foreign Application Priority Data

Oct. 1, 1980 [JP] Japan ............................ 55-140771[U]

[51] Int. Cl.³ .............................................. A45D 19/04
[52] U.S. Cl. ..................................... 248/397; 248/371; 248/396; 297/313
[58] Field of Search ............... 248/397, 396, 371, 394; 297/313; 74/22 A, 22 B

[56] References Cited

U.S. PATENT DOCUMENTS

| 178,721 | 6/1876 | Brintnall | 108/7 |
| 814,286 | 3/1906 | Harris | 108/7 X |
| 3,037,735 | 6/1962 | Matthews | 248/394 |
| 4,222,543 | 9/1980 | Gedig | 248/396 X |
| 4,271,830 | 6/1981 | Moon | 108/7 X |
| 4,326,690 | 4/1982 | Pickles | 248/396 |

FOREIGN PATENT DOCUMENTS

| 3306478 | 8/1974 | Fed. Rep. of Germany | 248/394 |
| 551808 | 3/1943 | United Kingdom | 248/396 |
| 718310 | 2/1980 | U.S.S.R. | 248/394 |

*Primary Examiner*—James T. McCall
*Attorney, Agent, or Firm*—Oblon, Fisher, Spivak, McClelland & Maier

[57] ABSTRACT

A vertically adjustable seat for vehicles which includes a shaft member, an axle connected to said shaft, a lever member operatively connected to a rear end portion of the seat at a first end thereof and to the axle and connected with a shaft member at a second end thereof opposite the first end, a female screw member forwardly and rearwardly moveable and operatively connected to the second end of a lever member by the axle, the handle fixedly connected to a front end portion of the shaft member and a supporting member for supporting the shaft member at front and rear side portions adjacent the female screw member.

14 Claims, 4 Drawing Figures

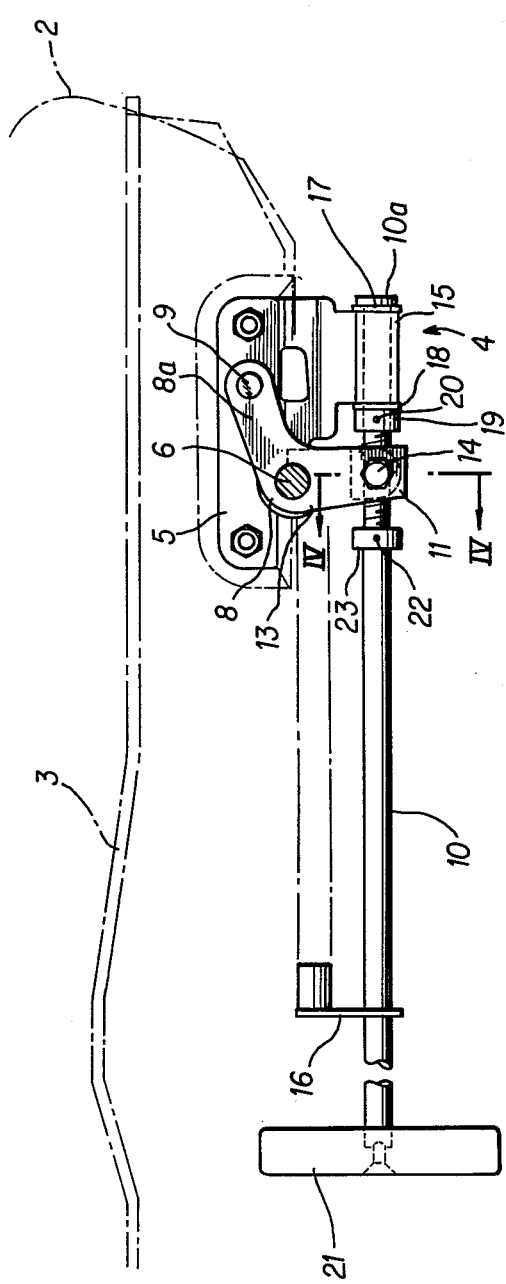
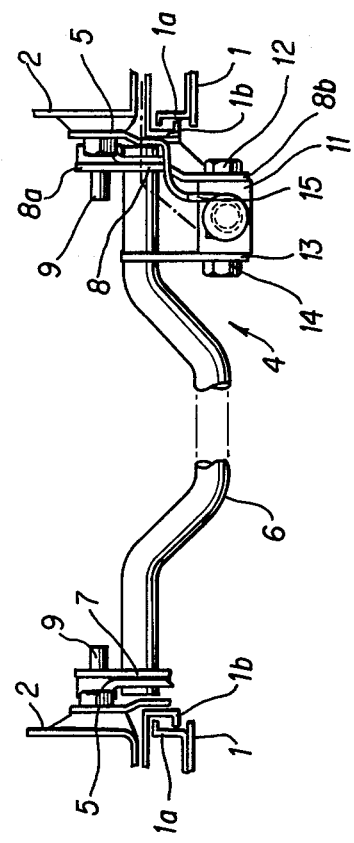
FIG. 2
FIG. 3

VERTICALLY ADJUSTABLE SEAT FOR VEHICLES

BACKGROUND OF THE INVENTION

1. Field of the Invention

The present invention relates to a vertically adjustable seat, and more particularly to a vertically adjustable seat for vehicles.

2. Description of the Prior Art

In a conventional vertically adjustable seat for vehicles the method for adjusting the seat calls for vertically adjusting the entire seat or a front portion and a rear portion of the seat independently. As is well-known, the latter is preferable for obtaining a desired seat position for a passenger.

In the situation where the front portion and rear portion of the seat are vertically and independently adjusted, the seat is supported at both the front and rear portions by a slidable seat apparatus through lateral axles and respective transverse axles and is vertically and independently adjusted.

It is, of course, necessary that the vertically adjustable seat can be continuously adjusted without hesitant movement of the seat. Insofar as almost the entire weight of the passenger is loaded on the rear portion of the seat and a large moment acts upwardly thereon about the front axle of the seat upon collision, the vertically adjustable seat should be durable and as small as possible in light of a limited available space.

SUMMARY OF THE INVENTION

An object of the present invention is to provide an improved vertically adjustable seat for vehicles which obviates the aforementioned drawbacks of the described conventional vertically adjustable seat.

A further object of the present invention is to provide an improved vertically adjustable seat for vehicles which can be reliably moved and vertically adjusted.

A still further object of this invention is to provide an improved vertically adjustable seat for vehicles which is relatively simple and includes a minimum number of parts.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIG. 2 is a sectional view taking along line II—II in FIG. 1;

FIG. 3 is a rearward view of the present invention;

FIG. 4 is a sectional view taking along line IV—IV in FIG. 2.

DETAILED DESCRIPTION OF THE PREFERRED EMBODIMENT

Figure 1:
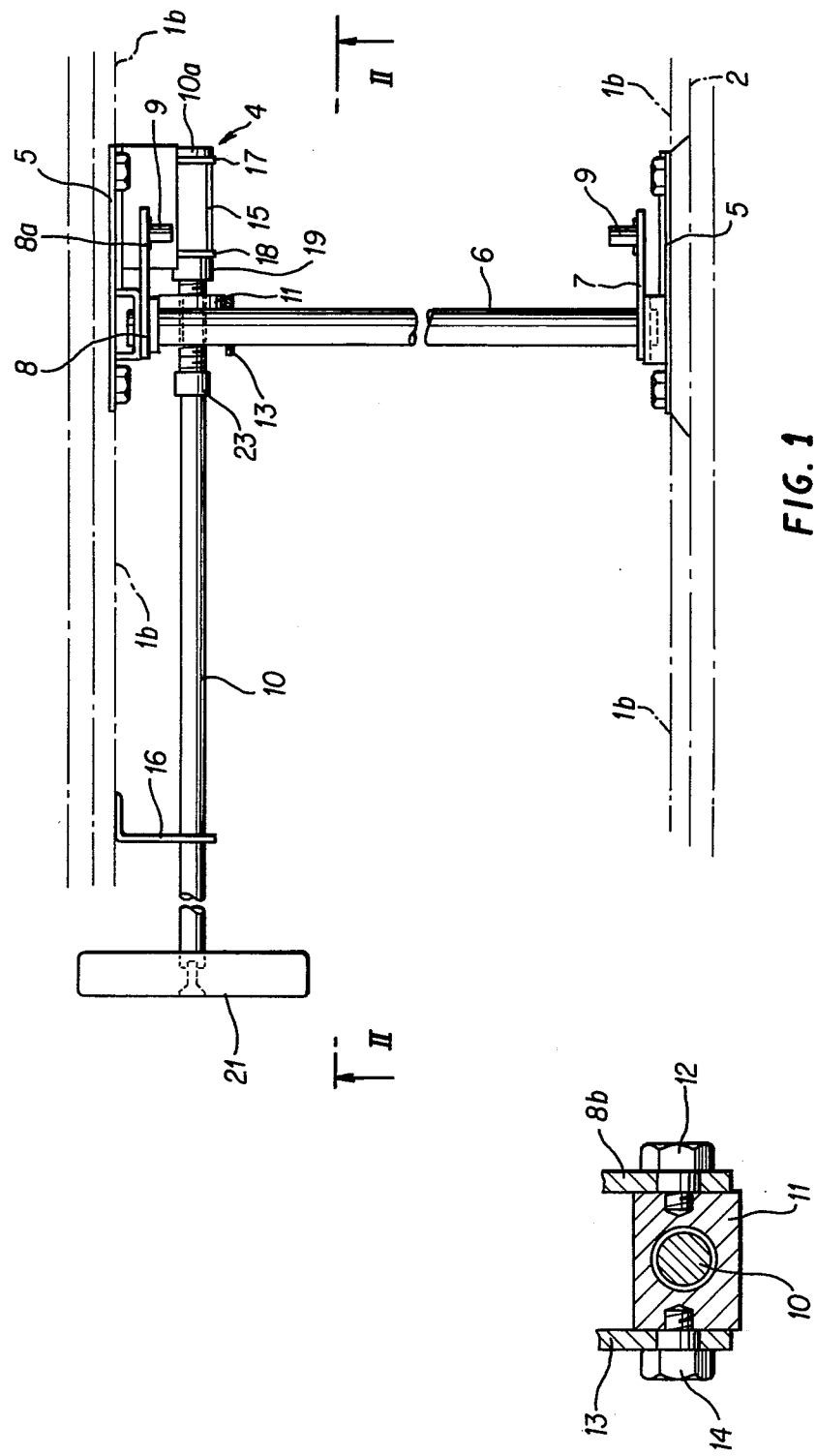
FIG. 1 is a plan view which shows a preferred embodiment of a vertically adjustable seat for vehicles according to the invention.

Referring now to FIGS. 1, 2 and 3, reference numeral 1 denotes a slidable seat apparatus and includes a pair of sliding rail mechanisms laterally disposed under a seat. Slidable seat apparatus 1 is provided with a fixed rail 1a fixed to a vehicle floor and a movable rail 1b for forward and rearward movement with respect to fixed rail 1a. A frame member 2 is pivotably mounted to each frame so as to constitute a seat reclining apparatus (not shown) which is fixedly mounted on an upper side of each of movable rails 1b and a backrest (not shown) of the seat is fixedly mounted on one of the frames.

Reference numeral 3 in FIG. 2 denotes a seat cushion frame member of the seat. Frame member 3 is supported on frame member 2 (or movable rail 1b) at a front portion thereof through a transverse axis (not shown) of the seat. A rear portion of frame member 3 is supported on frame member 2 by a vertically adjustable seat apparatus 4.

Vertically adjustable seat apparatus 4 is provided with a pair of attaching plates 5 fixed on each frame member 2 by means of a bolt (not shown). Both ends of a transverse axle 6 of the seat are rotatably supported by each attaching plate 5. A lever 7 is fixed to one end portion of axle 6 and a L-shaped lever 8 is fixed to other end portion thereof. L-shaped lever 8 is fixed to axle 6 so as to fold an arm portion 8a and lever 7 into the transverse direction of the seat.

Lever 7 and a free end portion of arm portion 8a of arm 8 are connected solely to a rear end part of frame member 3 of the seat cushion by a transverse axle 9. A free end portion of an arm portion 8b of the lever 8 is pivotally supported on one side of a female screw member 11 screwed into a front-and rearward shaft member 10 by a transverse stepped bolt 12 as shown in FIG. 4. A free end portion of lever 13 fixed to axle 6 is pivotally supported on the opposite side of female screw member 11 by a transverse stepped bolt 14 as shown in FIG. 4. A rear end portion of shaft member 10 is rotatably supported by a supporting portion 15 integrally formed on attaching plate 5 and a front end portion thereof is rotatably supported by a supporting member 16 fixed to movable rail 1b (or frame member 2).

Supporting portion 15 supporting the rear end portion of shaft member 10 has a U-shaped section. A flange portion 10a of shaft 10 is provided for engaging with the rear end of supporting portion 15 through a washer 17. A ring 19 engaged with a front end of supporting portion 15 through a washer 18 is fixedly mounted on shaft member 10 by means of a pin 20. A handle 21 is fixed to a front end of shaft member 10 for rotating the same. Extension of the forward end of female screw member 11 with respect to shaft member 10 is limited by a ring 23 fixed on shaft member 10 by a pin 22 and the extension of the rearward end thereof is limited by the ring 19.

Operation according to the present invention is as described hereinbelow. The load of the rear portion of the seat cushion based on the weight of the passenger is applied to levers 7, 8 from frame member 3 through axle 9 and axle 6 is rotated in a clockwise direction in FIG. 2. The rotational force is transmitted to female screw member 11 from levers 8, 13 through 12, 14 and shaft member 10 connected with female screw member 11 is moved forwardly. However, forward movement of shaft member 10 is limited by engagement with flange portion 10a and the rear end of supporting portion 15 through washer 17 so that the load is supplied on movable rail 2 from shaft 6 through attaching plate 5 and frame member 1b.

When the passenger desires to increase the height of the rear portion of the seat, shaft member 10 is rotated in a oneway direction by handle 21 and female screw member 11 is moved rearwardly. Movement of female screw member 11 is transmitted to axle 6 through bolts 12, 14 and levers 8, 13 and axle 6 is rotated in a counterclockwise direction in FIG. 2. Since levers 7, 8 are rotated together with axle 6, the rear portion of frame member 3 is lifted upwardly and the height of the rear portion of the seat cushion is correspondingly increased.

When the passenger wishes to decrease the rear portion of the seat cushion, the handle 21 is rotated in an opposite direction. The rotational center of levers 7, 8, 13 is axle 6 upon adjusting the height of the rear portion of the seat cushion so that female screw member 11 is movable upwardly and downwardly. However, the upward and downward movement of female screw member 11 is compensated for by the rear end portion of shaft member 10 which is moved upwardly and downwardly within supporting portion 15.

A large moment which lifts up the rear portion of the seat cushion is generated upon collision of the vehicle and a large rearward force acts on shaft member 10 from female screw member 11. Rearward movement of shaft member 10 is blocked by engagment of ring 19 fixed to shaft member 10 with the front end of supporting portion 15. At this time shaft member 10 receives a compressed load. However, insofar as the length from female member 11 to the front end of supporting member 15 is relatively short, shaft member 10 is not broken.

Since shaft member 10 is resistant to a pulling load, front supporting portion 16 is strengthened in construction and the flange engaged therewith is fixed on shaft member 10. Accordingly, such can be constructed such that rearward movement of the screw is limited by engaging the supporting member 16 and the shaft member 10.

By the foregoing, there has been disclosed a preferred form of vertically adjustable seat for vehicles constructed in accordance with the present invention. It will be appreciated that various additions, substitutions, modifications and omissions may be made thereto without departing from the spirit of the invention.

What is claimed as new and desired to be secured by Letters Patent of the United States is:

1. A vertically adjustable seat for vehicles, comprising:
   a shaft member;
   an axle connected to said seat;
   a lever member operatively connected to a rear end portion of said seat at a first end thereof and to said axle and connected with said shaft member at a second end thereof opposite said first end;
   a female screw member forwardly and rearwardly movable and operatively connected to said second end of said level member by said axle;
   a handle fixedly connected to a front end portion of said shaft member; and
   means for supporting said shaft member at front and rear side portions of said female screw member and wherein said supporting means further comprises a portion adjacent said female screw member extending axially relative to said shaft member.

2. A vertically adjustable seat for vehicles as set forth in claim 1, said supporting means further comprising a support member engaging said shaft member at a rear end portion thereof.

3. A vertically adjustable seat for vehicles as set forth in claim 1, said lever member comprising an L-shaped lever member.

4. A vertically adjustable seat for vehicles as set forth in claim 2, said support member comprising a U-shaped support member.

5. A vertically adjustable seat for vehicles as set forth in claim 1, further comprising:
   means mounted on said shaft for limiting movement of said female screw member.

6. A vertically adjustable seat for vehicles as set forth in claim 5, wherein said means for limiting movement of said female screw member further comprises a first and second stop member mounted on said shaft on opposite sides of said female screw member.

7. A vertically adjustable seat for vehicles as set forth in claim 1 wherein said supporting means further comprises a portion for rotatably mounting said level member.

8. A vertically adjustable seat for vehicles, comprising:
   a rotatable shaft member;
   an axle rotatably connected to said seat and disposed transversely to said shaft member;
   a lever member operatively connected exclusively to a rear end portion of said seat at a first end thereof and to said axle and connected with said shaft member at a second end thereof opposite said first end for vertical displacement only of said rear portion of said seat;
   a female screw member forwardly and rearwardly movable by rotation of said shaft member and operatively connected to said second end of said lever member by said axle;
   a handle fixedly connected to a front end portion of said shaft member; and
   means for supporting said shaft member at front and rear side portions of said female screw member and wherein said supporting means further comprises a portion adjacent said female screw member extending axially relative to said shaft member.

9. A vertically adjustable seat for vehicles as set forth in claim 8, said supporting means further comprising a support member engaging said shaft member at a rear end portion thereof.

10. A vertically adjustable seat for vehicles as set forth in claim 8, said lever member comprising an L-shaped lever member.

11. A vertically adjustable seat for vehicles as set forth in claim 9, said support member comprising a U-shaped support member.

12. A vertically adjustable seat for vehicles as set forth in claim 8, further comprising:
    means mounted on said shaft for limiting movement of said female screw member.

13. A vertically adjustable seat for vehicles as set forth in claim 12, wherein said means for limiting movement of said female screw member further comprises a first and second stop member mounted on said shaft on opposite sides of said female screw member.

14. A vertically adjustable seat for vehicles as set forth in claim 8, wherein said supporting means further comprises a portion for rotatably mounting said lever member.

* * * * *